(12) United States Patent
Merken et al.

(10) Patent No.: US 12,385,561 B2
(45) Date of Patent: Aug. 12, 2025

(54) ELECTRICALLY OPERABLE DRIVE TRAIN

(71) Applicant: Schaeffler Technologies AG & Co. KG, Herzogenaurach (DE)

(72) Inventors: Daniel Merken, Langensendelbach (DE); Joerg Bauer, Igensdorf (DE); Christian Berft, Cadolzburg (DE); Bastian Rupp, Furth (DE); Carolin Welscher, Hirschaid (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/034,724

(22) PCT Filed: Oct. 8, 2021

(86) PCT No.: PCT/DE2021/100813
§ 371 (c)(1),
(2) Date: May 1, 2023

(87) PCT Pub. No.: WO2022/089683
PCT Pub. Date: May 5, 2022

(65) Prior Publication Data
US 2023/0400091 A1 Dec. 14, 2023

(30) Foreign Application Priority Data
Nov. 2, 2020 (DE) .......................... 102020128710.0

(51) Int. Cl.
*F16H 57/03* (2012.01)
*B60K 1/00* (2006.01)
(Continued)

(52) U.S. Cl.
CPC ............. *F16H 57/032* (2013.01); *B60K 1/00* (2013.01); *F16H 57/025* (2013.01);
(Continued)

(58) Field of Classification Search
CPC .... F16H 57/031; F16H 57/032; F16H 57/025; F16H 57/028; F16H 2057/02034; F16H 2057/02043; F16H 2057/0325
See application file for complete search history.

(56) References Cited

U.S. PATENT DOCUMENTS 7,829,006 B2 * 11/2010 Aisenbrey ................ H01Q 1/40
264/328.6
9,188,214 B2 * 11/2015 Suto .......................... F16H 1/16
(Continued)

FOREIGN PATENT DOCUMENTS

DE       19548866 A1 *  1/1997  ................ B60S 1/08
DE   102014207600 A1 * 10/2015  ............. B29C 70/46
(Continued)

OTHER PUBLICATIONS

Machine Translation of DE 19548866 A1, obtained from FIT database (Year: 1997).*

*Primary Examiner* — Thomas C Diaz
(74) *Attorney, Agent, or Firm* — Volpe Koenig

(57) ABSTRACT

An electrically operable drive train of a motor vehicle, including an electric motor and a transmission arrangement, in which drive train the electric motor and the transmission arrangement form a structural unit, and the structural unit includes a first housing part and a second housing part, the first housing part and/or the second housing part having fastening means which bring about predefined positioning of the first housing part relative to the second housing part, and the first housing part is formed from a metal material, the second housing part being shaped from a plastics material by means of primary shaping processes, in particular by means of an injection moulding process, and having at least one insert part which is surrounded by plastics material in such
(Continued)

a way that it is arranged in the second housing part such that it transmits axial and/or radial force and/or torque.

18 Claims, 6 Drawing Sheets

(51) Int. Cl.
    *F16H 57/025*     (2012.01)
    *F16H 57/028*     (2012.01)
    *F16H 57/031*     (2012.01)
    *F16H 57/032*     (2012.01)
    *F16H 57/02*     (2012.01)

(52) U.S. Cl.
    CPC ........... *F16H 57/028* (2013.01); *F16H 57/03* (2013.01); *F16H 57/031* (2013.01); *F16H 2057/02034* (2013.01); *F16H 2057/02043* (2013.01); *F16H 2057/0325* (2013.01)

(56) References Cited

U.S. PATENT DOCUMENTS

| | | | |
|---|---|---|---|
| 10,371,257 B2 * | 8/2019 | Kume | H02K 11/33 |
| 10,619,717 B2 * | 4/2020 | Modrzejewski | F16H 55/06 |
| 10,703,201 B2 * | 7/2020 | Bassis | B60K 7/0007 |
| 11,519,500 B2 * | 12/2022 | Kannou | F16H 61/32 |
| 2022/0170541 A1 * | 6/2022 | Mueller | F16H 55/17 |
| 2023/0184319 A1 * | 6/2023 | Tao | F16H 57/023 |
| | | | 475/345 |

FOREIGN PATENT DOCUMENTS

| | | | | |
|---|---|---|---|---|
| DE | 102018123868 A1 | | 4/2020 | |
| DE | 102018129775 A1 | | 5/2020 | |
| DE | 102020104186 A1 | | 9/2020 | |
| EP | 3715201 A1 | * | 9/2020 | ........... B60T 13/741 |
| JP | 2001121618 A | * | 5/2001 | |
| JP | 2001180565 | | 7/2001 | |
| KR | 101708565 B1 | * | 2/2017 | |

* cited by examiner ized drive train of a motor vehicle, comprising an electric machine and a transmission arrangement, in which drive train the electric machine and the transmission arrangement form a structural unit, and the structural unit comprises a first housing part and a second housing part, the first housing part and/or the second housing part having fastening means, which bring about a predefined positioning of the first housing part relative to the second housing part, and the first housing part is formed in particular from a metallic material.

ELECTRICALLY OPERABLE DRIVE TRAIN

CROSS-REFERENCE TO RELATED APPLICATIONS

This application is the U.S. National Phase of PCT Appln. No. PCT/DE2021/100813, filed Oct. 8, 2021, which claims the benefit of German Patent Appln. No. 102020128710.0, filed Nov. 2, 2020, the entire disclosures of which are incorporated by reference herein.

TECHNICAL FIELD

The present disclosure relates to an electrically operable drive train of a motor vehicle, comprising an electric machine and a transmission arrangement, in which drive train the electric machine and the transmission arrangement form a structural unit, and the structural unit comprises a first housing part and a second housing part, the first housing part and/or the second housing part having fastening means, which bring about a predefined positioning of the first housing part relative to the second housing part, and the first housing part is formed in particular from a metallic material.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, May 2011, pages 360-365 by Erik Schneider, Frank Fickl, Bernd Cebulski and Jens Liebold with the title: "Highly integrative and flexible electric drive unit for e-vehicles", which is probably the closest prior art. This article describes a drive unit for an axle of a vehicle, which comprises an electric motor that is arranged concentrically and coaxially with a bevel gear differential, with a switchable 2-speed planetary gear set being arranged in the power train between the electric motor and the bevel gear differential, which is also is positioned coaxially to the electric motor or the bevel gear differential or spur gear differential. The drive unit is very compact and allows a good compromise between climbing ability, acceleration and energy consumption due to the switchable 2-speed planetary gear set. Such drive units are also referred to as e-axles or electrically operable drive trains.

The noise generated by the drive and its weight play an important role, particularly in the case of hybrid or fully electric drive concepts. However, these two requirements run counter to each other, with better noise insulation of the drive usually also resulting in a higher weight.

SUMMARY

It is therefore an object of the disclosure to provide an electrically operable drive train which is optimized in terms of smooth running and weight.

This object is achieved by an electrically operable drive train of a motor vehicle comprising an electric machine and a transmission arrangement, in which drive train the electric machine and the transmission arrangement form a structural unit, and the structural unit comprises a first housing part and a second housing part, whereby the first housing part and/or or the second housing part having fastening means, which bring about a predefined positioning of the first housing part relative to the second housing part, and the first housing part is formed in particular from a metallic material, the second housing part is formed from a plastic by means of a primary molding process, in particular by means of an injection molding process, and has at least one insert part, which is surrounded by plastic in such a way that it is arranged in the second housing part such that it transmits axial and/or radial force and/or torque, the insert part having a specific damping stiffness between $>=1,500$ kN*cm/g and $<=25,000$ kN*cm/g, preferably between $>=1,800$ kN*cm/g and $<=15,000$ kN*cm/g and the housing part has a specific damping stiffness between $>=20$ kN*cm/g and $<1,800$ kN*cm/g, preferably between $>=200$ kN*cm/g and $<1,500$ kN*cm/g.

As a result, a noise and weight-optimized electrically operable drive train can be made available. The combination of the insert part with the second housing part creates a composite component which is optimized for use in an electrically operable drive train.

An electrically operable drive train comprises an electric machine and a transmission arrangement coupled to the electric machine. The transmission arrangement and the electric machine form a structural unit. This can be formed, for example, by means of a drive train housing, in which the transmission arrangement and the electric machine are accommodated together. The drive train housing is preferably formed from a metallic material, particularly preferably from aluminum, gray cast iron or cast steel, in particular by means of a primary shaping process such as casting or die-casting. In principle, however, it would also be possible to form the drive train housing from a plastic. The drive train housing can particularly preferably have a pot-like basic shape, so that the electric machine and the transmission can be inserted into the drive train housing via the open end face thereof. In connection with this embodiment of the disclosure, it is particularly advantageous that the first housing part is designed as a drive train housing. It is also preferred in this context that the second housing part is a cover for closing the drive train housing at the front.

Alternatively, it would of course also be possible for the electric machine to have a motor housing and the transmission to have a transmission housing, in which case the structural unit can then be effected by fixing the transmission in relation to the electric machine.

The transmission housing is a housing for accommodating a transmission. It has the task of guiding existing shafts via the bearings and giving the wheels (possibly cam disks) the degrees of freedom they require under all loads without impeding their rotational and possible path movement, as well as absorbing bearing forces and supporting torques.

A transmission housing can be single-shell or multi-shell, that is, undivided or divided. In particular, the housing should also dampen noise and vibrations and also be able to safely absorb lubricant.

The transmission housing is preferably formed from a metallic material, particularly preferably from aluminum, gray cast iron or cast steel, in particular by means of a primary shaping process such as casting or die-casting. In principle, however, it would also be possible to form the transmission housing partially or completely from a plastic.

The motor housing encloses the electric machine. A motor housing can also accommodate the control and power electronics. The motor housing can furthermore be part of a cooling system for the electric machine, and can be designed in such a way that cooling fluid can be supplied to the electric machine via the housing and/or the heat can be dissipated to the outside via the housing surfaces. In addition, the motor housing protects the electric machine and any electronics that may be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic.

According to this embodiment of the disclosure, it would then be advantageous for the first housing part to be the motor housing or the transmission housing. In this context, it is also preferred that the second housing part is a cover for closing the motor housing or the transmission housing at the front side.

The electric machine is used to convert electrical energy into mechanical energy and/or vice versa, and generally comprises a stationary part referred to as a stator, stand, or armature, and a part referred to as a rotor or runner, and arranged movably, in particular rotatably, relative to the stationary part.

In particular, the electric machine is dimensioned in such a way that vehicle speeds of more than 50 km/h, preferably more than 80 km/h and in particular more than 100 km/h can be achieved. The electric motor particularly preferably has an output of more than 30 kW, preferably more than 50 kW and in particular more than 70 kW. Furthermore, it is preferred that the electric machine provides speeds greater than rpm, particularly preferably greater than 10,000 rpm, very particularly preferably greater than 12,500 rpm.

For the purposes of this application, motor vehicles are land vehicles that are moved by machine power without being restricted to railroad tracks. A motor vehicle can be selected, for example, from the group of passenger cars, trucks, small motorcycles, light motor vehicles, motorcycles, motor buses coaches or tractors.

In particular, the transmission arrangement can be coupled to the electric machine, which is designed to generate a drive torque for the motor vehicle. The drive torque is particularly preferably a main drive torque, so that the motor vehicle is driven exclusively by the drive torque. The transmission arrangement is preferably designed as a planetary gearing, very particularly preferably as a switchable, in particular two-speed planetary gearing.

The specific damping stiffness is defined as modulus of elasticity/density. The modulus of elasticity can be determined according to DIN EN ISO 6892-1 and/or DIN EN ISO 527-1/-2. The density can be determined using DIN EN ISO 1183 and/or DIN EN ISO 2738. The specific damping stiffness has proven to be a suitable parameter for describing the weight-specific damping and stiffness of a component. Within the intervals of the specific damping stiffness according to the disclosure, high noise and vibration damping can be achieved with low weight and high stiffness.

In particular, due to the low weight, advantages in the energy efficiency of motor vehicles with an electrically operable drive train according to the disclosure can be realized.

It has also been shown that the second housing part has improved thermal insulation within the interval of the specific damping stiffness according to the disclosure, which can be used, for example, to heat a cooling and/or lubricating fluid more quickly after a cold start of the electric machine, so that the operating temperature of the electric machine can be reached more quickly. This also makes it possible to provide improved energy efficiency for the electric machine.

According to an advantageous embodiment of the disclosure it can be provided that the plastic of the second housing part is fiber-reinforced and the average fiber length of the fibers is between $>=0.1$ and $<=50$ mm, preferably between $>=0.1$ and $<=25$ mm, particularly preferably between $>=0.1$ and $<=8$ mm. The advantage of this configuration lies in the fact that it allows a further increase in rigidity to be brought about at the same time as improved noise damping.

According to a further preferred further development of the disclosure, it can also be provided that the insert part is fiber-reinforced and the average fiber length of the fibers is between $>50$ mm and $<=860$ mm, preferably between $>50$ mm and $<=560$ mm, whereby a further optimization of the rigidity and vibration damping properties can be realized.

It can also be further preferred for the insert part to have a specific damping stiffness of between $>=1,800$ kN*cm/g and $<=15,000$ kN*cm/g and for the second housing part to have a specific damping stiffness of between $>-20$ kN*cm/g and $<1,800$ kN*cm/g. In this context, it is particularly preferred that the insert part is not fiber-reinforced.

It is also possible for the insert part to have a specific damping stiffness between $>=1,800$ kN*cm/g and $<=25,000$ kN*cm/g and for the second housing part to have a specific damping stiffness between $>=20$ kN*cm/g and $<1,800$ kN*cm/g. In this context, it is also particularly advantageous that the insert part is fiber-reinforced and the average fiber length of the fibers is between $>50$ mm and $<=860$ mm. In this context, it is also particularly advantageous that the second housing part is fiber-reinforced and the average fiber length of the fibers is selected to be between $>0.1$ mm and $<=25$ mm.

It has also proven to be advantageous if the insert part has a specific damping stiffness of between $>=1,500$ kN*cm/g and $<=25,000$ kN*cm/g and the housing part has a specific damping stiffness of between $>-20$ kN*cm/g and $<1,500$ kN*cm/g. In this context, it is also particularly advantageous that the insert part is fiber-reinforced and the average fiber length of the fibers is between $>50$ mm and $<=860$ mm. In this context, it is also particularly advantageous that the second housing part is fiber-reinforced and the average fiber length of the fibers is selected to be between $>0.1$ mm and $<=25$ mm.

Furthermore, according to a likewise advantageous embodiment of the disclosure, provision can be made for the second housing part to be in the form of a housing cover. It has been shown that noise dampening and weight reduction are particularly efficient with a housing cover. The housing cover particularly preferably has a disc-shaped or plate-shaped basic shape. The housing cover particularly preferably has a circular or cylindrical basic shape.

According to a further particularly preferred embodiment of the disclosure, it can be provided that the insert part is designed as a reinforcement, as a result of which particularly effective noise and vibration damping is made possible. The reinforcement can be partially or completely surrounded by the plastic of the second housing part. In order to form the reinforcement, it is also conceivable for a plurality of insert parts to be present, which together form the reinforcement.

Furthermore, the disclosure can also be further developed such that the reinforcement has at least one annular bearing seat on which a bearing, in particular a roller bearing or sliding bearing, can be positioned so that an integrated bearing seat can be formed.

In a likewise preferred embodiment variant of the disclosure, it can also be provided that the reinforcement has fastening openings through which the fastening means for fixing the second housing part to the first housing part pass. In this way, in particular the transmission of force and/or torque at the attachment points of the second housing part to the first housing part can be optimized.

It can also be advantageous to further develop the disclosure such that the reinforcement comprises fastening means by means of which the second housing part can be fastened to a drive train suspension, whereby separate fastening means, such as a screw, can be dispensed with.

According to a further preferred embodiment of the subject matter of the disclosure, it can be provided that the insert part is an internally toothed ring gear. This ring gear can be the ring gear of a planetary gearing, for example. Finally, the disclosure can also be advantageously implemented in such a way that the insert part is a roller bearing or a part thereof or a sliding bearing or a part thereof, for example for mounting a shaft within the electrically operable drive train. In this way, in particular, a separate assembly of these components can also be dispensed with, as a result of which the assembly process is simplified.

According to a further preferred embodiment of the disclosure, the insert part can be a ring with a lateral surface running in the axial direction, the ring having a section protruding from its lateral surface in the radial direction. It is thus possible, for example, to form a bearing seat that can also absorb axial forces in particular. In this context, it is also advantageous that the insert part realizes a radial force absorption.

Finally, it can also be preferred that the insert part is a sleeve through which a fastening means extends, as a result of which an improved fastening of the second housing part in relation to a further component can be produced.

It goes without saying that the second housing part can have a plurality of insert parts. In particular, it is possible for the second housing part to have different insert parts.

Furthermore, it can be advantageous for at least one sensor in the second housing part to be surrounded by plastic at least in sections, so that a measured variable can be detected by the sensor integrated in the second housing part. A measured variable is preferably recorded in the interior of the first housing part. The measured variable can be, for example, a temperature, a speed, a direction of rotation and/or a pressure.

The disclosure will be explained in more detail below with reference to figures without limiting the general concept of the disclosure.

DETAILED DESCRIPTION

Figure 1:
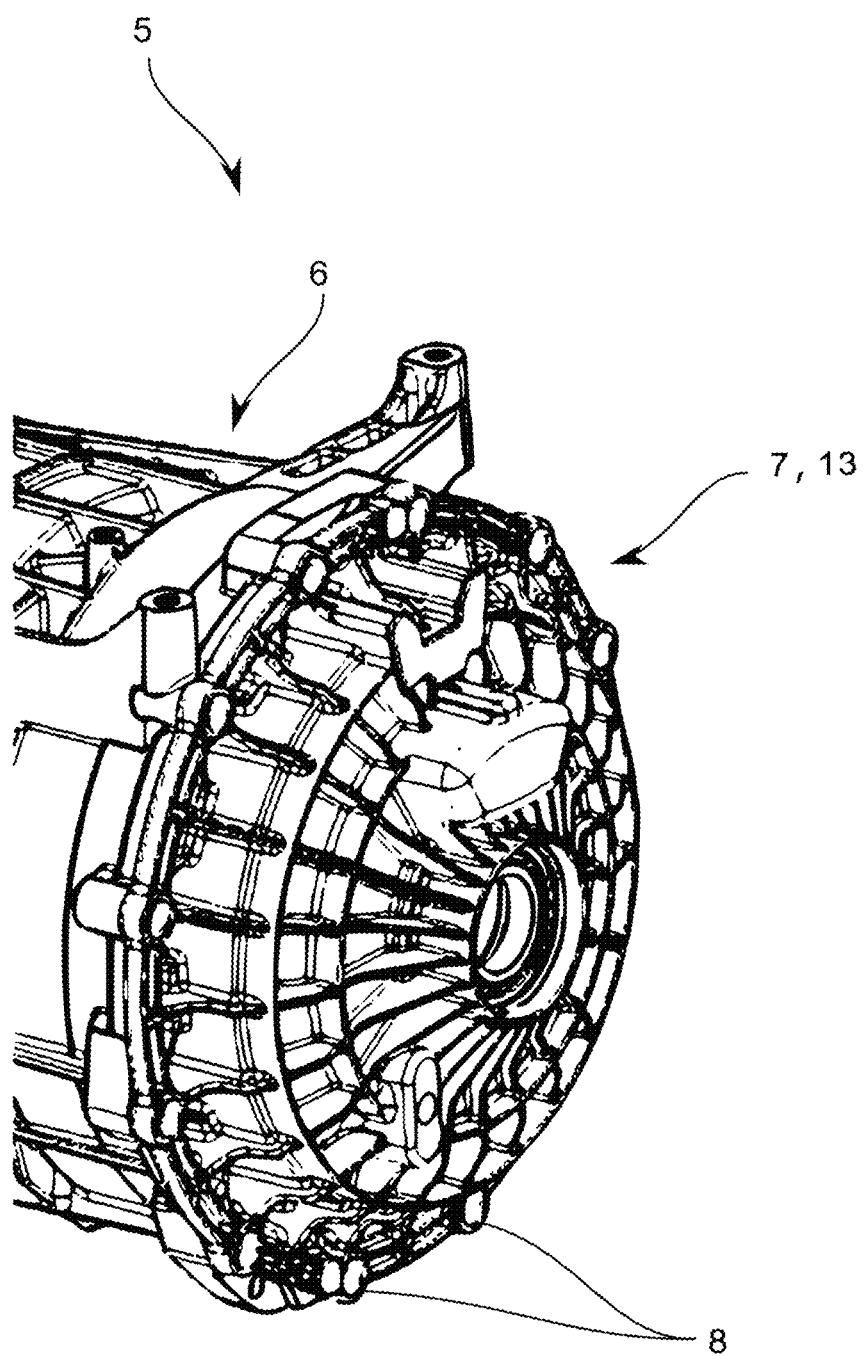
FIG. 1 shows a first embodiment of the electrically operable drive train in a coaxial configuration.
Figure 5:
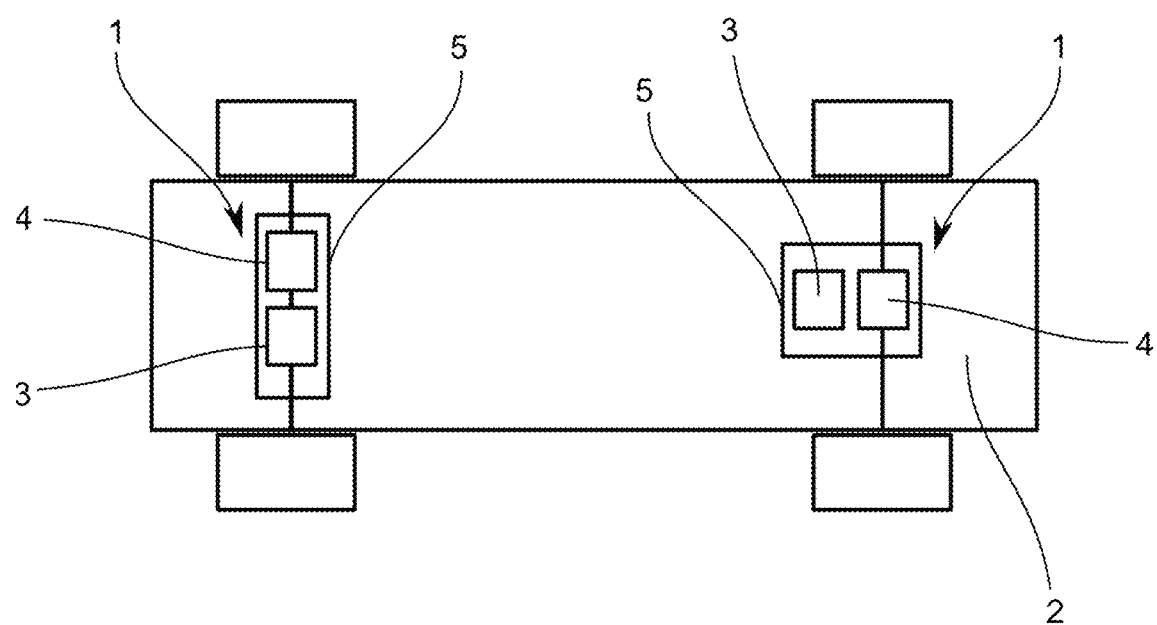
FIG. 5 shows a motor vehicle with electrically operable drive trains.

FIG. 1 shows a first embodiment of an electrically operable drive train 1 of a motor vehicle 2 comprising an electric machine 3 and a transmission arrangement 4, the electric machine 3 and the transmission arrangement 4 forming a structural unit 5. This is shown as an example in FIG. 5. The left axle of the motor vehicle 1 is provided with a coaxial design of an electrically operable drive train 1, while the right axle shows an axially parallel design of an electrically operable drive train 1. This is discussed in more detail below.

The structural unit 5 shown in FIG. 1 corresponds to a coaxial design. The structural unit 5 has a first housing part 6 in which an electric machine 3 and a transmission arrangement 4 are arranged. In the exemplary embodiment shown, the first housing part 6 is made from die-cast aluminum. The structural unit also has a second housing part 7 designed as a housing cover 13, with the first housing part 6 and the second housing part 7 having fastening means 8 in the form of screws and corresponding internal threads, as a result of which a predefined positioning of the first housing part 6 relative to the second housing part 7 is brought about.

The second housing part 7 is formed from a plastic by means of a primary molding process, in particular by means of an injection molding process. The second housing part 7 has at least one insert part 9, which is surrounded by plastic in such a way that it is arranged in the second housing part 7, which is designed as a housing cover 13, such that it transmits axial and radial forces and torque. This can be seen particularly well in the illustration in FIG. 2. In the exemplary embodiment of a second housing part 7 shown in FIG. 2, the insert part 9 is designed as an internally toothed ring gear 10 for a planetary gearing.

Figure 2:
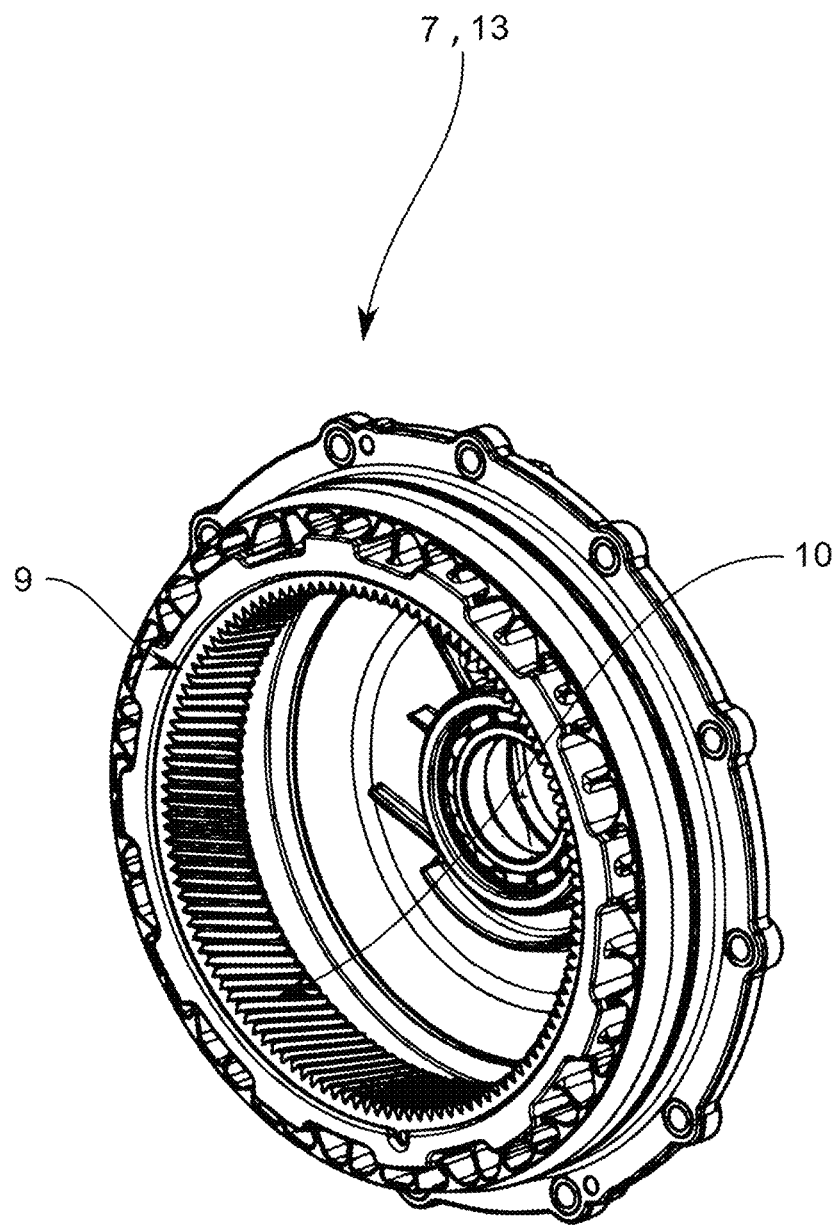
FIG. 2 shows a first embodiment of a housing cover in a perspective view.
Figure 3:
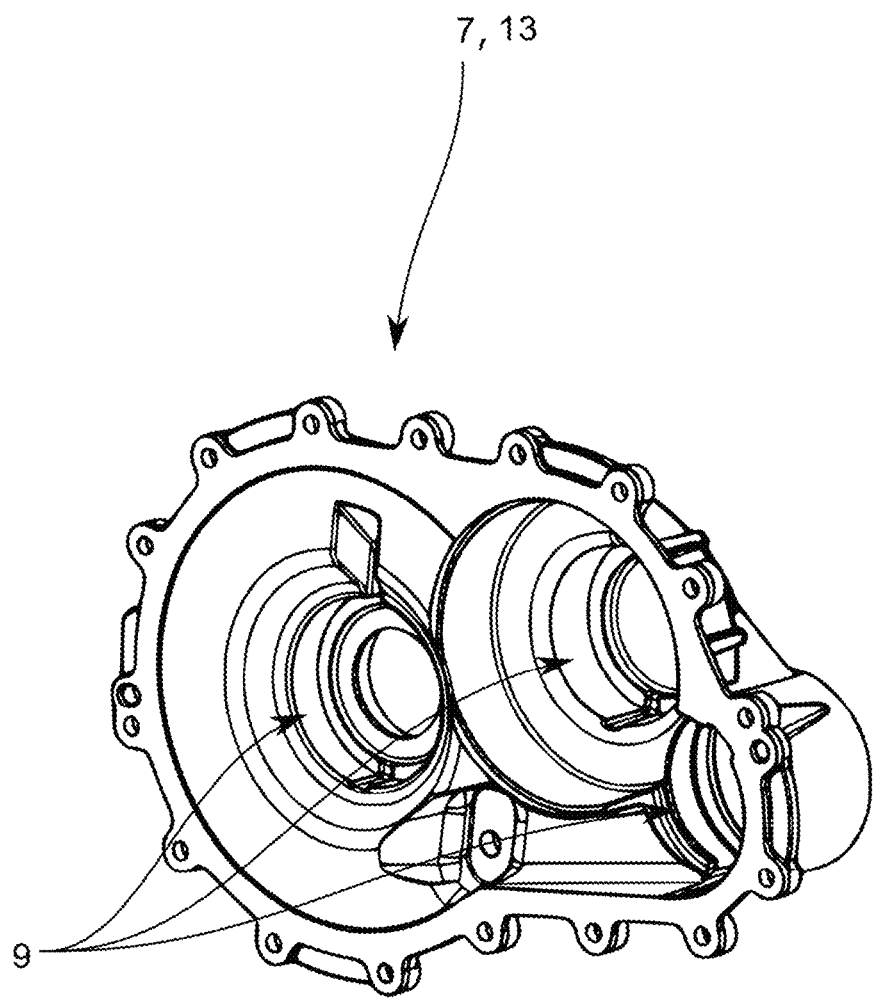
FIG. 3 shows a second embodiment of a housing cover in a perspective view.
Figure 6:
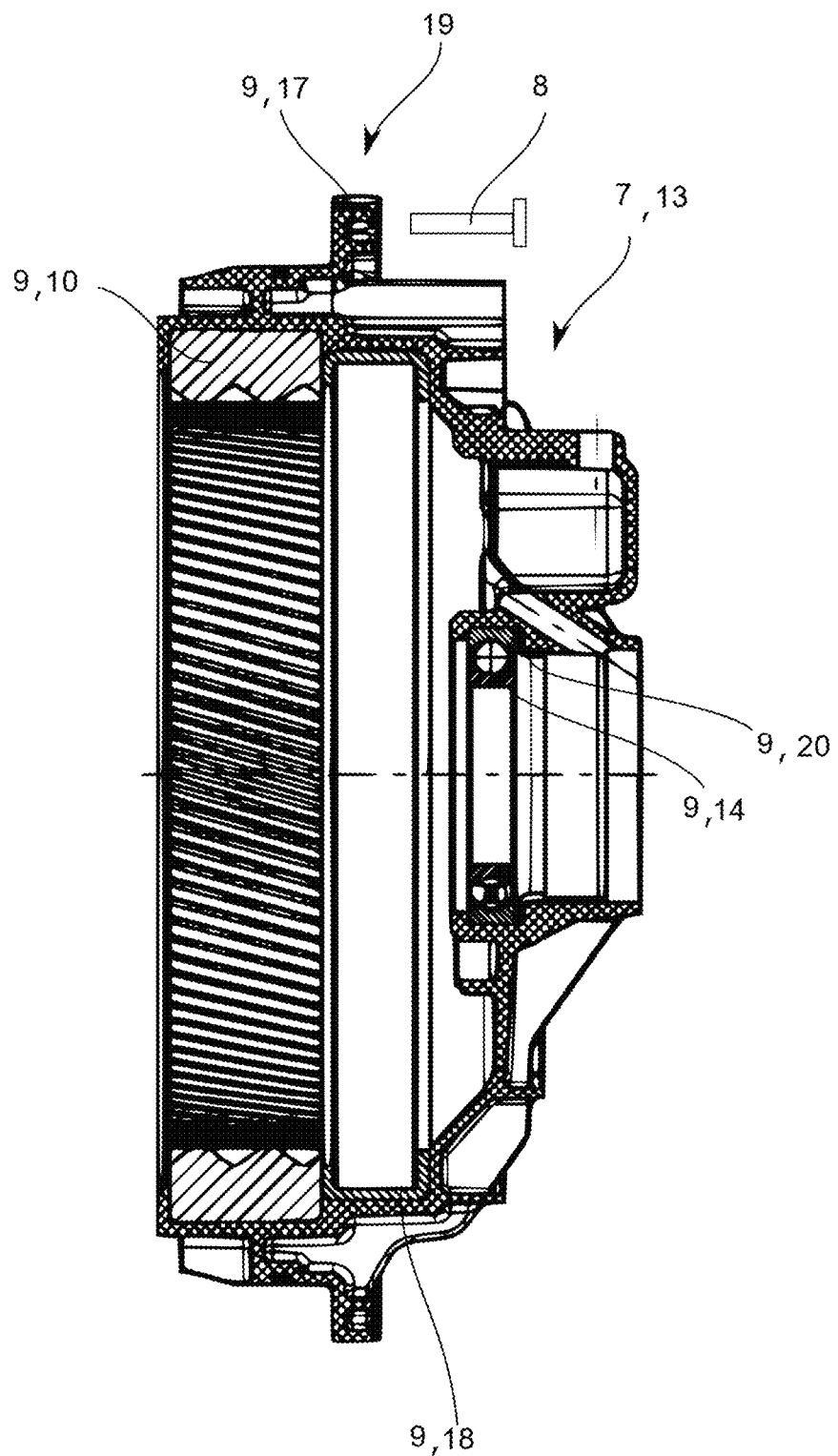
FIG. 6 shows a first embodiment of a housing cover in an axial sectional view.

FIG. 6 shows a cross-sectional view of the second housing part 7 known from FIGS. 2 and 3. This representation clearly shows that the ring gear 10 is overmolded axially on both sides by the plastic of the second housing part 7.

In order to improve the axial fixing of ring gear 10 and in particular the absorption of axial forces, an additional ring-like insert part 18 with a U-shaped cross section can be arranged in second housing part 7, against which the ring gear 10 rests axially at least in sections. The free leg of the U-shaped insert part 18 lying axially on the ring gear 10 and running in the radial direction is configured in such a way that it only bears within the root circle radius of the ring gear 10. In the exemplary embodiment shown in FIG. 6, the free leg of the U-shaped insert part 18 that is not in contact with the ring gear 10 and runs in the radial direction is longer than the free leg that is in contact with the ring gear 10. It extends radially inwards, the radius of which is greater than or equal to the tip circle radius of the ring gear 10.

The U-shaped insert part 18 thus also enables the injection molding tool to be configured in a way that is favorable in terms of production technology, by means of which the second housing part 7 is manufactured. In particular, demolding is simplified in the embodiment shown in FIG. 6, since the second housing part 7 has no injection-molded undercuts due to the U-shaped insert part.

In principle, the U-shaped insert part 18 can also have other cross-sectional contours, such as V, W, N, C, O, X, Z, or S-shaped cross-sectional contours. Such an insert part can in principle be used to increase the force absorption, in particular for axial and/or radial force absorption.

Furthermore, a roller bearing 14 is arranged as an insert part 9 in the second housing part 7. The roller bearing 14 has a diameter that is smaller than the diameter of the ring gear 10 and smaller than the smallest diameter of the insert part 18.

The roller bearing 14 is also overmolded axially on both sides by the plastic of the second housing part 7. As with the ring gear 10, an insert part 9 can also be provided for the roller bearing 14 to increase the axial and/or radial force absorption. For this purpose, an insert part 20 with an L-shaped cross section is provided in the second housing part 7, with the roller bearing 14 being supported axially on the radially extending section of the L-shaped insert part 20. It would also be possible to arrange a further bearing, for example a roller bearing or sliding bearing, on the axially running section of the L-shaped insert part 20, but this is not shown in FIG. 6. In the embodiment shown, the second housing part 7 can also assume the function of an A or B end shield of the electric machine.

The second housing part 7 also has on its radially outer lateral surface fastening sections 19 which protrude radially outwards and by means of which the second housing part 7 can be fixed on the first housing part 6. For this purpose, an insert part 9 in the form of a metal sleeve 17 is provided in a fastening section 19, through which a fastening means 8—here a screw—engages.

The insert parts 9 have a specific damping stiffness between >=1,500 kN*cm/g and <=25,000 kN*cm/g, preferably between >=1,800 kN*cm/g and <=15,000 kN*cm/g and the housing part 7 has a specific damping stiffness between >=20 kN*cm/g and <1,800 kN*cm/g, preferably between >=200 kN*cm/g and <1,500 kN*cm/g.

FIG. 3 shows a second housing part 7 configured as a housing cover 13, which is configured for use in an axially parallel structure of the structural unit 5. The insert part 9 is designed as a reinforcement 11 in the embodiment shown in FIG. 3. The reinforcement 11 has three axially parallel, circular bearing seats 12, on which a bearing, in particular a roller bearing 14 or sliding bearing, can be positioned. The reinforcement 11 is shown again in FIG. 4 in an isolated view.

Figure 4:
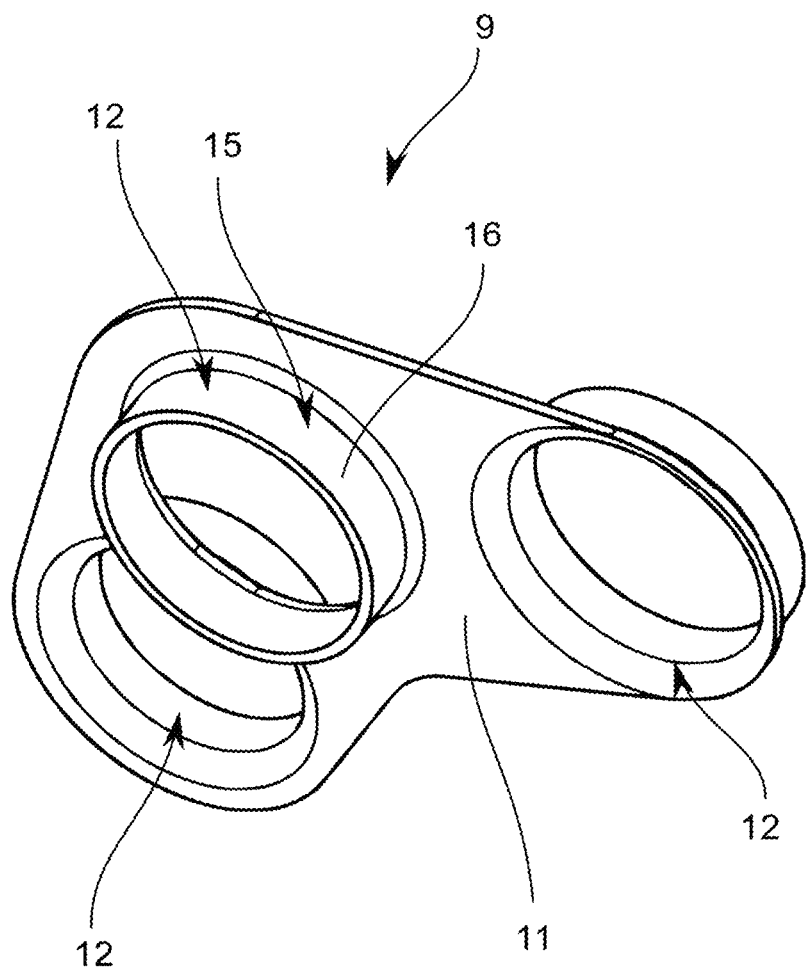
FIG. 4 shows a reinforcement in a perspective view.

The reinforcement 11 can have fastening openings—which is not shown in FIGS. 3-4—which are penetrated by the fastening means 8—such as screws—in order to affix the second housing part 7 to the first housing part 6.

The bearing seats 12 are each formed as a ring 15 with a lateral surface 16 running in the axial direction, the ring 15 having a section protruding from its lateral surface in the radial direction. In the exemplary embodiment shown, these sections are connected to one another in one piece in one plane to form the reinforcement 11. The lateral surfaces 16 running in the axial direction extend out of the reinforcement 11 in different axial directions.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Drive train
2 Motor vehicle
3 Machine
4 Transmission arrangement
5 Unit
6 Housing part
7 Housing part
8 Fastening means
9 Insert part
10 Ring gear
11 Reinforcement
12 Bearing seat
13 Housing cover
14 Rolling bearing
15 Ring
16 Lateral surface
17 Sleeve
18 Insert part
19 Fastening section
20 Insert part

The invention claimed is:

1. An electrically operable drive train for a motor vehicle comprising:
an electric machine and a transmission arrangement, the electric machine and the transmission arrangement form a structural unit, and the structural unit includes a first housing part and a second housing part fastened together with fasteners which bring about a predefined positioning of the first housing part relative to the second housing part, and the first housing part is a metal part, wherein the second housing part is a molded plastic part, and has at least one insert part surrounded by plastic and arranged in the second housing part such that it transmits axial and/or radial force and/or torque, wherein the insert part has a specific damping stiffness of between >=1,500 kN*cm/g and <=25,000 kN*cm/g, and the second housing part has a specific damping stiffness of between >=20 kN*cm/g and <1,800 kN*cm/g, wherein the at least one insert part includes an internally toothed ring gear and a ring-like insert part against which the ring gear rests axially at least in sections, and wherein the ring gear abuts the insert part only within the root circle radius of the ring gear.

2. The electrically operable drive train according to claim 1, wherein the plastic of the second housing part is fiber-reinforced and an average fiber length of the fibers is between >=0.1 and <=50 mm.

3. The electrically operable drive train according claim 1, wherein the insert part is fiber-reinforced and an average fiber length of the fibers is between >50 mm and <=860 mm.

4. The electrically operable drive train according to claim 1, wherein the second housing part is a housing cover.

5. The electrically operable drive train according to claim 1, wherein the at least one insert part further includes a reinforcement.

6. The electrically operable drive train according to claim 5, wherein the reinforcement comprises a fastener for fastening the second housing part to a drive train suspension.

7. The electrically operable drive train according to claim 1, wherein the at least one insert part further includes a sleeve through which a fastener extends.

8. The electrically operable drive train according to claim 1, wherein in the second housing part at least one sensor is at least partially surrounded by plastic.

9. The electrically operable drive train according to claim 1, wherein the ring-like insert has a U-shaped cross-section.

10. An electrically operable drive train for a motor vehicle comprising:
an electric machine and a transmission arrangement, the electric machine and the transmission arrangement form a structural unit, and the structural unit includes a first housing part and a second housing part fastened together with fasteners which bring about a predefined positioning of the first housing part relative to the second housing part, and the first housing part is a metal part, wherein the second housing part is a molded plastic part, and has at least one insert part surrounded by plastic and arranged in the second housing part such that it transmits axial and/or radial force and/or torque, wherein the insert part has a specific damping stiffness of between >=1,500 kN*cm/g and <=25,000 kN*cm/g, and the second housing part has a specific damping stiffness of between >=20 kN*cm/g and <1,800 kN*cm/g, wherein the at least one insert part includes an internally toothed ring gear and a ring-like insert part against which the ring gear rests axially at least in sections, wherein the ring-like insert has a U-shaped cross-section, and wherein the ring gear abuts a first free leg of the U-shaped insert part only within a root circle radius of the ring gear.

11. The electrically operable drive train according to claim 10, wherein a second free leg of the U-shaped cross-section of the ring-like insert that is not in contact with the ring gear and runs in the radial direction is longer than the first free leg of the U-shaped cross-section of the ring-like insert that is in contact with the ring gear.

12. The electrically operable drive train according to claim 11, wherein the second free leg extends radially inwards and has a radius that is greater than or equal to the tip circle radius of the ring gear.

13. The electrically operable drive train according claim 10, wherein the insert part is fiber-reinforced and an average fiber length of the fibers is between >50 mm and <=860 mm.

14. The electrically operable drive train according to claim 10, wherein the second housing part is a housing cover.

15. The electrically operable drive train according to claim 10, wherein the at least one insert part further includes a reinforcement.

16. The electrically operable drive train according to claim 15, wherein the reinforcement comprises a fastener for fastening the second housing part to a drive train suspension.

17. The electrically operable drive train according to claim 10, wherein the at least one insert part further includes a sleeve through which a fastener extends.

18. The electrically operable drive train according to claim 10, wherein in the second housing part at least one sensor is at least partially surrounded by plastic.

* * * * *